United States Patent [19]
Inokuchi et al.

[11] 3,988,287
[45] Oct. 26, 1976

[54] POLYAMIDE COMPOSITIONS

[75] Inventors: Norio Inokuchi; Tomoyoshi Ono, both of Hino, Japan

[73] Assignee: Teijin Limited, Osaka, Japan

[22] Filed: Jan. 24, 1975

[21] Appl. No.: 544,004

[30] Foreign Application Priority Data
Feb. 9, 1974  Japan .............................. 49-15873
June 14, 1974  Japan .............................. 49-67099

[52] U.S. Cl. ................... 260/37 N; 260/42.15; 260/824 EP
[51] Int. Cl.² ................. C08L 43/04; C08L 77/06; C08L 77/10
[58] Field of Search .......... 260/37 N, 42.15, 824 EP

[56] References Cited
UNITED STATES PATENTS

| | | | |
|---|---|---|---|
| 2,776,910 | 1/1957 | Erickson et al. ........... | 260/824 EP X |
| 2,962,471 | 11/1960 | Long et al. ................. | 260/824 EP X |
| 3,306,800 | 2/1967 | Plueddemann............ | 260/824 EP X |
| 3,519,593 | 7/1970 | Bolger......................... | 260/42.15 X |
| 3,542,585 | 11/1970 | Heit ............................ | 260/824 EP X |
| 3,833,534 | 9/1974 | Tierney et al............... | 260/37 N |
| 3,843,591 | 10/1974 | Hedrick et al. ............. | 260/37 N |
| 3,855,175 | 12/1974 | Kakizaki..................... | 260/42.15 |

*Primary Examiner*—Donald E. Czaja
*Assistant Examiner*—S. M. Person
*Attorney, Agent, or Firm*—Sherman & Shalloway

[57] ABSTRACT

A polyamide composition comprising a polyamide, an inorganic filler, a compound containing an unsaturated double bond and an epoxy group in one molecule and an unsaturated organic silane. Preferably, said compound having an unsaturated double bond and an epoxy group in one molecule and said unsaturated organic silane are present in the heat-polymerized state in the composition.

18 Claims, No Drawings

POLYAMIDE COMPOSITIONS

This invention relates to a polyamide composition, and more specifically, to an inorganic filler to be added to improve the properties of polyamides.

It has been well known to incorporate a fibrous substance such as glass fibers in a polyamide in order to improve its mechanical and thermal properties such as the tensile strength, flexural strength, elasticity modulus, heat distortion temperature, dimensional stability, hardness or creep characteristics. According to the recent practice, an inexpensive inorganic filler, such as clay or talc, is used instead of the expensive glass fibers to reduce the cost of production.

If, however, these glass fibers or other inorganic fillers are added to polyamides without pretreatment, satisfactory properties cannot be obtained because of the poor affinity of the inorganic fillers for the polyamides, and the resulting products are brittle and of low commercial value. In an attempt to remedy such a defect, it has been the practice to pretreat the inorganic filler such as clay, talc, or calcium carbonate with a functional organic group-containing silane compound, chromium compound, surface active agent, or fatty acid polymer solution or latex thereby improving the wetting property or reactivity between the inorganic filler and the resin. Satisfactory results have been obtained with such a treatment when the inorganic filler is a glass fiber, but in the case of such an inorganic filler as clay, talc or calcium carbonate, the adhesion between the treating agent and the inorganic filler and the compatibility of the inorganic filler with the polyamide are insufficient. Thus, no satisfactory effect of reinforcing the polyamide can be obtained.

This method further has the disadvantage that the procedure of treating the inorganic filler with the treating agent is complicated, and the treating agent is expensive or unstable.

Accordingly, it is an object of this invention to provide a polyamide composition of improved properties which contains an inorganic filler, and also a process for preparing the polyamide composition.

Extensive investigations in an attempt to achieve the above object led to the discovery that by mixing a polyamide with an inorganic filler and specific compounds, a polyamide composition having superior properties can be very easily obtained.

According to this invention, there is provided a polyamide composition comprising (1) a polyamide, (2) an inorganic filler, (3) a compound containing an unsaturated double bond and an epoxy group in one molecule and (4) an unsaturated organic silane.

The polyamides used in this invention are not limited in particular, but aliphatic and aromatic polyamides can be used. The aliphatic polyamides are especially preferred. Examples of the aliphatic polyamides are nylon-6, nylon-6,6, nylon-6,10, nylon-6,12, nylon-11 and nylon-12. Examples of the aromatic polyamides are poly(hexamethylene diamine terephthalamide), and poly(hexamethylene diamine isophthalamide). They may be used also as mixtures or copolymers with each other.

The inorganic filler includes, for example, talc, clay, mica, silica, quartz, alumina, calcium silicate, calcium carbonate, wollastonite, asbestos, or carbon black. These inorganic fillers may be used either alone or in admixture of two or more. Generally, any inorganic fillers which are incorporated in thermoplastic or thermosetting resins mainly for the purpose of extending them or improving their hardness, elasticity modulus or dimensional stability can be used in this invention.

The amount of the inorganic filler is 5 to 70% by weight, preferably 20 to 60% by weight based on the total weight of the composition. If the amount is less than 5% by weight, the physical, thermal and chemical properties of the polyamide composition cannot be improved to a satisfactory degree. On the other hand, if it exceeds 70% by weight, shaped articles prepared from the resulting polyamide composition become brittle. In addition, the resulting composition has poor moldability, and the surface condition of the shaped articles becomes poor to degrade their commercial value.

Typical examples of the compound containing a double bond and an epoxy group in one molecule are glycidyl acrylate, glycidyl methacrylate, and glycidyl allyl ether. The amount of this compound is 0.025 to 7% by weight, preferably 0.05 to 6% by weight, based on the total weight of the composition. If the amount of this compound is less than 0.025% by weight or larger than 7% by weight, the properties of the polyamide composition are degraded, and the use of a great quantity of this compound is disadvantageous because of an increased cost of production.

The unsaturated organic silane used in this invention is expressed by the following general formula $$XSiY_3$$

wherein X is a functional organic group containing at least one unsaturated double bond, and Y is a group hydrolyzable to a hydroxyl group, such as a halogen, alcohoxy or acetoxy group, and is generally called a silane coupling agent. It is used mainly as a treating agent for plastic-reinforced glass fibers. Typical examples of the silane are vinyl triethoxysilane, vinyl trimethoxysilane, vinyl tris($\beta$-methoxyethoxy) silane, vinyl trichlorosilane, $\gamma$-methacryloxypropyl tris($\beta$-methoxyethoxy) silane, and vinyl triacetoxy silane.

The amount of the unsaturated organic silane is 0.015 to 4% by weight, preferably 0.025 to 3% by weight, based on the total weight of the composition. Just as in the case of the compound having an unsaturated double bond and an epoxy group in one molecule, good results can not be obtained if the amount is outside the range specified above.

Various procedures are available to mix the polyamide, the inorganic filler, the compound containing an unsaturated double bond and an epoxy group in one molecule, and the unsaturated organic silane. For example, the four ingredients may be blended at the same time. In this case, the epoxy compound and the organic silane are considered to penetrate into the interface between the polyamide and the inorganic filler, and the mixing operation is very easy, too. Alternatively, the inorganic filler is first mixed with the epoxy compound and the organic silane, and then, the mixture is blended with the polyamide. Although this method is more complicated than the first-mentioned method in respect of operation, it has the advantage that almost all of the epoxy compound and the organic silane used are considered to exist on the interface between the polyamide and the inorganic filler. In this method, the inorganic filler can be treated by mixing it with the epoxy compound and the unsaturated organic silane. This operation is very easy. Also, the inorganic filler can be first mixed with either one of the epoxy compound or the unsaturated organic silane, and then with the other. Since the unsaturated organic silane will first act on the surface of the inorganic filler, it is preferred to mix the inorganic filler first with the unsaturated organic silane. An organic solvent can be used in this invention in order to ensure an effective contact of these compounds with each other. Preferably, the organic solvent is one which fully dissolves the epoxy compound and the unsaturated organic silane, but does not react with them, and also which wets the inorganic filler well. Examples of preferred organic solvents are ketones such as acetone, or alcohols such as ethyl alcohol or methyl alcohol.

Preferably, the resulting mixture of the inorganic filler, the epoxy compound and the unsaturated organic silane is heated. The heating temperature may vary according to the types or reactivities of these substances, but is usually 30 to 200° C., preferably 40° to 180° C.

In order to have the reaction proceed fully and rapidly, a radical polymerization initiator may be added to the above substances. Furthermore, it is preferred to heat the mixture in an atmosphere of an inert gas such as a nitrogen gas in order to prevent undesirable side-reactions.

According to another method, the inorganic filler is mixed first with either one of the epoxy compound or the unsaturated organic silane, and then with the other of these compound and the polyamide. In this method also, a solvent or a catalyst may be used in the treatment of the inorganic filler.

The polyamide composition of this invention as prepared above may further contain other additives such as a stabilizer, plasticizer, cross-linking agent, fire-retarding agent, antistatic agent, or thickener. It may also contain a reinforcing agent such as glass fibers.

The physical, thermal and chemical properties of shaped articles prepared from the polyamide composition of this invention are far superior to those of the polyamide itself. An especially marked improvement is noted in regard to the flexural strength, elasticity modulus, impact strength, heat distortion temperature, and dimensional stability. In addition, since the inexpensive inorganic filler can be incorporated in great quantities in the expensive polyamides, the polyamide compositions of this invention also offer economical advantages.

The following Examples illustrate the present invention in greater detail. In these Examples, all parts are by weight. The physical properties shown in the Examples were measured by the following methods.

(1) Tensile strength and elongation
    ASTM D-638
(2) Flexural strength, elasticity modulus, flex
    ASTM D-790
(3) Impact strength (Izod, notched ¼", ⅛")
    ASTM D-256
(4) Rockwell hardness (R scale)
    ASTM D-785
(5) Heat distortion temperature (264 psi)
    ASTM D-648
(6) Molding shrinkage A test specimen, 96 mm × 85 mm × 4 mm in size, molded in a mold at 60° C. was allowed to stand for 48 hours in an atmosphere kept at a temperature of 23° C. and a relative humidity of 65%, and then the length of the specimen was measured both in the longitudinal and transverse directions. The molding shrinkage was calculated from the following equations.

$$\frac{\text{Molding shrinkage in the}}{\text{longitudinal direction (\%)}} = \frac{96 - \text{measured value}}{96} \times 100$$

$$\frac{\text{Molding shrinkage in the}}{\text{transverse direction (\%)}} = \frac{85 - \text{measured value}}{85} \times 100$$

EXAMPLE 1

Two parts of vinyl tris($\beta$-methoxyethoxy) silane, 4 parts of glycidyl methacrylate and 0.12 part of benzoyl peroxide were dissolved in 160 parts of acetone.

100 Parts of calcined clay (Burgess No. 30, a product of Burgess Pigment Co.) was mixed with the above solution, and dried fully. The calcined clay so treated was blended with 150 parts of well dried nylon-6 having an intrinsic viscosity of 1.35 using a screw-type extruder. The resulting chips of the nylon composition were molded by an injection molding machine to prepare test pieces. The properties of the test pieces were determined as follows:

| | |
|---|---|
| Tensile strength at break | 920 Kg/cm$^2$ |
| Tensile elongation at break | 6 % |
| Flexural strength | 1430 Kg/cm$^2$ |
| Flexural modulus | 56400 Kg/cm$^2$ |
| Flexural flex | 1.1 cm |
| Impact strength | |
| ¼ inch | 6.5 Kg cm/cm |
| ⅛ inch | 6.3 Kg cm/cm |
| Rockwell hardness (R scale) | 116 |
| Heat distortion temperature (264 psi) | 121° |
| Molding shrinkage (thickness 4 mm, mold temperature 60° C.) | |
| Longitudinal direction | 1.004 |
| Transverse direction | 1.053 |

EXAMPLE 2

Two parts of vinyl tris($\beta$-methoxyethoxy) silane, 4 parts of glycidyl methacrylate, 0.1 part of t-butyl peroxybenzoate and 0.1 part of dicumyl peroxide were dissolved in 160 parts of acetone.

To the acetone solution were added 0.1 part of ion exchange water and 0.03 part of glacial acetic acid, and the mixture was thoroughly stirred at room temperature for 30 minutes. 100 parts of calcined clay was mixed with the solution, and then dried sufficiently. The treated calcined clay was heated in a nitrogen atmosphere for 1 hour at 70° C. and then for 2 hours at 160° C.

Then, the treated clay was blended with 150 parts of nylon-6 using an extruder, and the resulting composition was molded. The properties of the molded articles were determined, and are shown in Table 1.

EXAMPLE 3

Two parts of vinyl tris-($\beta$-methoxyethoxy) silane, 4 parts of glycidyl methacrylate and 0.12 part of benzoyl peroxide were heated in an atmosphere of nitrogen at 60° C. for 1 hour. The resulting polymer had a molecular weight of 1,200 (measured by a vapor pressure osmometer).

The polymer was dissolved in 160 parts of acetone, and 100 parts of calcined clay was added. After thorough mixing, the product was sufficiently dried.

The calcined clay so treated was blended with 150 parts of nylon-6, and the composition was molded. The properties of the molded article were determined, and are shown in Table 1.

COMPARATIVE EXAMPLE 1

100 parts of calcined clay, sufficiently dried but untreated, were blended with 150 parts of nylon-6, and the resulting composition was molded in the same way as in Example 2. The properties of the molded article are shown in Table 1.

COMPARATIVE EXAMPLE 2

Example 2 was repeated except that the glycidyl methacrylate was not used. The properties of the molded article are shown in Table 1.

COMPARATIVE EXAMPLE 3

Example 2 was repeated except that the vinyl tris($\beta$-methoxyethoxy) silane was not used. The properties of the molded article are shown in Table 1.

COMPARATIVE EXAMPLE 4

Two parts of $\gamma$-glycidoxypropyl trimethoxy silane was dissolved in 160 parts of acetone, and then 100 parts of calcined clay was added, followed by thorough drying.

The calcined clay so treated was blended with 150 parts of nylon-6 using an extruder, and molded in the same way as in Example 2. The properties of the molded article are shown in Table 1.

EXAMPLE 5

One part of $\gamma$-methacryloxypropyltrimethoxy silane was added to a solution consisting of 120 parts of deionized water and 0.03 part of glacial acetic acid. The solution was sufficiently stirred at room temperature for 30 minutes. Then, 100 parts of wollastonite (F-1, a product of Interpace Corp.) was added, and after thorough mixing, the mixture was filtered.

After drying at room tdmperature and atmospheric pressure, the wollastonite so treated was mixed with a solution of 2 parts of glycidyl allyl ether, 0.06 part of t-butyl peroxybenzoate, and 0.06 part of dicumyl peroxide in 100 parts of acetone, and the mixture was sufficiently dried.

The wollastonite so treated was suffciently dried at room temperature and atmospheric pressure, and heated in an atmosphere of nitrogen for 2 hours at 70° C. and then for 2.5 hours at 160° C. It was then blended with 150 parts of nylon-6 using an extruder, and molded. The properties of the molded article are shown in Table 2.

EXAMPLE 6

Two parts of vinyltriethoxy silane and 4 parts of glycidyl acrylate were dissolved in 100 parts of acetone, and 100 parts of silica (Crystallite A-1, a product of Shiraishi Calcium Co.) was added to the solution, followed by thorough mixing.

The silica so treated was blended with 150 parts of nylon-6 using an extruder, and the composition was molded. The properties of the molded article are shown in Table 2.

Table 1

| | Tensile | | Flexural | | | |
|---|---|---|---|---|---|---|
| Run No. | strength at break (Kg/cm$^2$) | elongation at break (%) | strength (Kg/cm$^2$) | elasticity modulus (Kg/cm$^2$) | flex (cm) | Impact strength (Kg cm/cm) |
| Example 2 | 910 | 5 | 1510 | 53700 | 1.0 | 4.5 |
| Example 3 | 900 | 7 | 1490 | 55100 | 1.3 | 4.6 |
| Comparative Example 1 | 675 | 0.8 | 1240 | 47300 | 0.6 | 2.8 |
| Comparative Example 2 | 700 | 0.9 | 1290 | 49800 | 0.7 | 2.4 |
| Comparative Example 3 | 680 | 0.9 | 1260 | 50100 | 0.6 | 2.6 |
| Comparative Example 4 | 850 | 3.5 | 1350 | 50000 | 1.0 | 3.5 |

EXAMPLE 4

Two parts of $\gamma$-methacryloxypropyltrimethoxy silane, 2 parts of glycidyl methacrylate, 0.08 part of t-butylperoxy benzoate and 0.08 part of dicumyl peroxide were dissolved in 120 parts of acetone. To the solution was added 0.1 part of ion-exchanged water and 0.03 part of glacial acetic acid, and the mixture was stirred at room temperature for 15 minutes. 100 parts of talc (Talc MS, a product of Nippon Talc Co.) was mixed with the above solution, and sufficiently dried.

The talc so treated was sufficiently dried at room temperature and atmospheric pressure, and heated at 70° C. for000511 hour, and then ât 150 C. for 3 hours in stream of nitrogen.

The talc was then blended with 150 parts of nylon-6 using an extruder, and the composition was molded. The properties of the molded article are shown in Table 2.

COMPARATIVE EXAMPLE 5

100 parts of talc sufficiently dried but not treated was blended with 150 parts of nylon-6 using an extruder, and the composition was molded in the same way as in Example 4. The properties of the resulting molded article are shown in Table 2.

COMPARATIVE EXAMPLE 6

100 parts of wollastonite sufficiently dried but not treated was blended with 150 parts of nylon-6 using an extruder, and the composition was molded in the same way as in Example 5. The properties of the resulting molded article are shown in Table 2.

COMPARATIVE EXAMPLE 7

100 parts of silica sufficiently dried but not treated was blended with 150 parts of nylon-6 using an extruder, and the composition was molded in the same way as in Example 6. The properties of the molded article are shown in Table 2.

Table 4 using an extruder. The composition was molded. The properties of the molded article are shown in Table 4.

Table 2

| Runs | Tensile strength at break (Kg/cm$^2$) | elon- gation at break (%) | Flexural strength (Kg/cm$^2$) | elasti- city modulus (Kg/cm$^2$) | flex (cm) | Impact strength (Kg.cm/cm) |
|---|---|---|---|---|---|---|
| Example 4 | 840 | 6 | 1490 | 50800 | 1.3 | 4.3 |
| Comparative Example 5 | 640 | 0.4 | 970 | 48500 | 0.6 | 2.6 |
| Example 5 | 990 | 5 | 1600 | 54000 | 1.0 | 5.1 |
| Comparative Example 6 | 680 | 0.9 | 1190 | 4700 | 0.8 | 2.5 |
| Example 6 | 980 | 6.1 | 1580 | 53900 | 1.5 | 4.9 |
| Comparative Example 7 | 630 | 0.7 | 1100 | 49000 | 0.8 | 2.8 |

EXAMPLES 7 to 10

Two parts of each of the various unsaturated organic silanes shown in Table 3, 4 parts of glycidyl methacrylate and 0.12 part of benzoyl peroxide were dissolved in 160 parts of acetone, and 100 parts of calcined clay were added to the solution, followed by thorough mixing.

The proportion of the calcined clay shown in Table 4 is based on the weight of the clay before the above treatment.

COMPARATIVE EXAMPLE 8

Nylon-6 alone was molded, and the properties of the molded article are shown in Table 4.

Table 4

| Runs | Blending proportions Nylon-6 | Calcined clay | Flexural strength (kg/cm$^2$) | modulus of elasticity (Kg/cm$^2$) | Impact strength (Kg.cm/cm) |
|---|---|---|---|---|---|
| Example 11 | 90 | 10 | 1310 | 33450 | 4.2 |
| Example 12 | 80 | 20 | 1370 | 38700 | 4.3 |
| Example 13 | 70 | 30 | 1480 | 47400 | 4.5 |
| Example 14 | 60 | 40 | 1600 | 56500 | 4.9 |
| Example 15 | 50 | 50 | 1790 | 68300 | 5.0 |
| Example 16 | 40 | 60 | 1850 | 79000 | 4.1 |
| Comparative Example 8 | 100 | 0 | 1020 | 23300 | 3.9 |

The calcined clay so treated was heated in an atmosphere of nitrogen at 70° C. for 4 hours. Then, the clay was blended with 150 parts of nylon-6 using an extruder, and the composition was molded. The molded article had the properties shown in Table 3.

EXAMPLES 17 to 21

Four parts of vinyl tris(β-methoxyethoxy) silane, 8 parts of glycidyl methacrylate and 0.24 part of benzoyl peroxide were dissolved in 160 parts of acetone. 100

Table 3

| Runs | Type of the un- saturated organic silane | Flexural strength (kg/cm$^2$) | elasticity modulus (kg/cm$^2$) | flex (cm) | Impact strength (Kg.cm/cm) |
|---|---|---|---|---|---|
| Example 7 | Vinyl triacetoxy silane | 1510 | 53600 | 1.2 | 5.2 |
| 8 | Vinyl trimethoxy silane | 1540 | 51000 | 1.0 | 4.9 |
| 9 | Vinyl trichloro- silane | 1490 | 56700 | 1.4 | 4.6 |
| 10 | γ-Methacryloxy- propyl tris(β- methoxyethoxy) silane | 1500 | 49800 | 1.0 | 4.9 |

EXAMPLES 11 to 16

Two parts of γ-methacryloxypropyltrimethoxy silane, 4 parts of glycidyl methacrylate and 0.12 part of benzoyl peroxide were dissolved in 160 parts of acetone. 100 parts of calcined clay were mixed with this solution, and dried thoroughly.

The calcined clay so treated and nylon-6 were blended with each other in the proportions indicated in parts of calcined clay were mixed with the acetone solution, and dried sufficiently. The calcined clay so treated was heated in an atmosphere of nitrogen at 70° C. for 4 hours. Then, the calcined clay was blended with 100 parts of each of the nylons shown in Table 5 using an extruder, and the composition was molded. The properties of the molded article are shown in Table 5.

Table 5

| Runs | Type of nylon | Flexural strength (Kg/cm$^2$) | Flexural elasticity modulus (Kg/cm$^2$) | Impact strength (kg.cm/cm) |
| --- | --- | --- | --- | --- |
| Example 17 | Nylon-6,6 | 1800 | 69200 | 5.1 |
| Example 18 | Nylon-6,10 | 1100 | 48600 | 3.8 |
| Example 19 | Nylon-6,12 | 900 | 35000 | 3.2 |
| Example 20 | Nylon-11 | 800 | 30900 | 2.7 |
| Example 21 | Nylon-12 | 600 | 28800 | 3.0 |

What we claim is:

1. In a polyamide composition comprising a polyamide, from 5 to 70 percent by weight, based on the total composition of an inorganic filler selected from the group consisting of talc, clay, mica, silica, quartz, alumina, calcium silicate, calcium carbonate, wollastonite, asbestos and carbon black, and a treating agent for improving the compatability of said polyamide and inorganic filler, the improvement comprising a treating agent consisting essentially of from 0.025 to 7 percent by weight, based on the total composition of (a) a compound containing an unsaturated double bond and an epoxy group in one molecule and from 0.015 to 4 percent by weight, based on the total composition of (b) an unsaturated organic silane wherein said compound (a) having an unsaturated double bond and an epoxy group in one molecule and said unsaturated organic silane (b) are present in the heat-polymerized state in the composition.

2. The composition of claim 1 comprising, on the basis of the entire composition, 5 to 70% by weight of the inorganic filler, 0.025 to 7% by weight of the compound having an unsaturated double bond and an epoxy group in one molecule and 0.015 to 4% by weight of the unsaturated organic silane.

3. The composition of claim 1 wherein said polyamide is selected from the group consisting of nylon-6, nylon-66, nylon-6,10, nylon-6,12, nylon-11 and nylon-12.

4. The composition of claim 1 wherein said inorganic filler is selected from the group consisting of clay, silica, talc, quartz and wollastonite.

5. The composition of claim 1 wherein said compound containing an unsaturated double bond and an epoxy group in one molecule is selected from the group consisting of glycidyl acrylate, glycidyl methacrylate and glycidyl allyl ether.

6. The composition of claim 1 wherein said unsaturated organic silane is selected from the group consisting of vinyl triethoxy silane, vinyl tris($\beta$-methoxyethoxy) silane, vinyl trichlorosilane, $\gamma$-methacryloxypropyl trimethoxy silane, $\gamma$-methacryloxy propyl tris($\beta$-methoxyethoxy) silane and vinyl triacetoxy silane.

7. The composition of claim 1 wherein said polyamide is nylon-6 or nylon-66, said inorganic filler is clay or wollastonite, said compound containing an unsaturated double bond and an epoxy group in one molecule is glycidyl methacrylate, and said unsaturated organic silane is vinyl tris($\beta$-methoxyethoxy) silane.

8. The composition of claim 1 wherein said heat-polymerized polymer is one obtained by heat-polymerizing said compound having an unsaturated double bond and an epoxy group in one molecule and said unsaturated organic silane in the presence of a polymerization initiator.

9. A process for preparing the composition of claim 1, which comprises heating a mixture of said polyamide, inorganic filler, compound having an unsaturated double bond in one molecule and unsaturated organic silane to a temperature above the melting point of the polyamide.

10. A process for preparing the composition of claim 1 which comprises heating a mixture consisting of the inorganic filler, the compound having an unsaturated double bond and an epoxy group in one molecule to a temperature of at least 30° C., and adding the resulting mixture of the heat polymerized product and the inorganic filler to the polyamide.

11. A process for preparing the composition of claim 1 which comprises heating a mixture consisting of the compound having an unsaturated double bond and an epoxy group in one molecule and the unsaturated organic silane to a temperature of at least 30° C., and adding the resulting heat-polymerized product and the inorganic filler to the polyamide.

12. A process for preparing the composition of claim 1 which comprises heating a mixture of the inorganic filler, the compound containing an unsaturated double bond and an epoxy group in one molecule and the unsaturated organic silane to a temperature of at least 30° C., adding the resulting mixture of the heat-polymerized product and the inorganic filler to the polyamide, and heating the mixture to a temperature higher than the melting point of the polyamide.

13. A process for preparing the composition of claim 1 which comprises heating a mixture of the compound having an unsaturated double bond and an epoxy group in one molecule and the unsaturated organic silane to a temperature of at least 30° C., adding the resulting mixture of the heat-polymerized product and the inorganic filler to the polyamide, and heating the mixture to a temperature higher than the melting point of the polyamide.

14. A filler composition for improving the properties of polyamide articles, said composition comprising an inorganic filler selected from the group consisting of talc, clay, mica, silica, quartz, alumina, calcium silicate, calcium carbonate, wollastonite, asbestos and carbon black, and a treating agent for improving the compatability of said inorganic filler and polyamide consisting essentially of (a) a compound having an unsaturated double bond and an epoxy group in one molecule and (b) an unsaturated organic silane wherein said compound (a) having an unsaturated double bond and an epoxy group in one molecule and said unsaturated organic silane (b) are present in the heat-polymerized state and wherein the weight ratio of inorganic filler to compound (a) to silane (b) is from 5–70:0.025–7:0.015–4.

15. A process for preparing the filler composition of claim 14 which comprises heating a mixture of the compound containing an unsaturated double bond and an epoxy group in one molecule, the unsaturated organic silane and the inorganic filler to a temperature of at least 30° C.

16. A process for preparing the filler composition of claim 14 which comprises heating a mixture of the compound containing an unsaturated double bond and an epoxy group in one molecule and the unsaturated organic silane to a temperature of at least 30° C., and mixing the resulting heat-polymerized product with the inorganic filler.

17. The filler composition of claim 14 wherein said compound containing an unsaturated double bond and an epoxy group in one molecule is selected from the group consisting of glycidyl acrylate, glycidyl methacrylate and glycidyl allyl ether; and said unsaturated organic silane, is selected from the group consisting of vinyl triethoxy silane, vinyl tris (β-methoxyethoxy) silane, vinyl trichlorosilane, γ-methacryloxypropyl trimethoxy silane, γ-methacryloxy propyl tris (β-methoxyethoxy) silane and vinyl triacetoxy silane.

18. The filler composition of claim 17 wherein said inorganic filler is selected from the group consisting of clay, silica, talc, quartz and wollastonite.

* * * * *